United States Patent [19]

Oakes et al.

[11] 4,196,917

[45] Apr. 8, 1980

[54] HYDRAULIC LOCK FOR THE SWINGABLE TONGUE OF A TOWED MACHINE

[75] Inventors: Jay E. Oakes; Wilbur M. Davis, both of Ottumwa, Iowa

[73] Assignee: Deere & Company, Moline, Ill.

[21] Appl. No.: 922,047

[22] Filed: Jul. 5, 1978

[51] Int. Cl.² ............................................. B60D 1/14
[52] U.S. Cl. ..................................... 280/463; 172/324
[58] Field of Search ............... 280/463, 468, 445, 462; 172/324, 446, 476; 60/472, 493; 91/462, 445

[56] References Cited

U.S. PATENT DOCUMENTS

| | | | |
|---|---|---|---|
| 1,172,748 | 2/1916 | Sparling | 91/445 X |
| 3,124,371 | 3/1964 | Weir | 280/463 |
| 3,369,360 | 2/1968 | DeBiasi | 60/493 |
| 3,832,837 | 9/1974 | Burkhart | 280/463 X |
| 4,072,096 | 2/1978 | Phillips | 91/445 |

FOREIGN PATENT DOCUMENTS

| | | | |
|---|---|---|---|
| 1480226 | 6/1970 | Fed. Rep. of Germany | 280/463 |
| 1327059 | 4/1963 | France | 280/462 |

Primary Examiner—John A. Pekar

[57] ABSTRACT

A pull-type mobile harvesting machine includes a header supported on a main frame and an arch-like tongue swingably connected to the main frame and extending forward over the header for pivoting connection to a tractor. A double-acting hydraulic steering cylinder controlled from the tractor is connected between the frame and tongue for swinging the tongue relative to the frame while the machine is advancing so that the machine is displaced laterally selectively between a range of operating positions, offset relative to the tractor, and transport positions, generally immediately behind the tractor. A shut-off valve in one of the hydraulic lines to the cylinder makes it possible to trap oil in one side of the cylinder in any given condition of cylinder extension, thus locking the tongue in a given position relative to the frame and also preventing flow of oil to the cylinder so that inadvertent manipulation of a cylinder control valve at the tractor does not cause accidental swinging of the tongue and lateral displacement of the machine relative to the tractor.

9 Claims, 4 Drawing Figures

HYDRAULIC LOCK FOR THE SWINGABLE TONGUE OF A TOWED MACHINE

BACKGROUND OF THE INVENTION

The present invention relates generally to mobile towed machines of the type having a tongue swingable in relation to the machine frame about an approximately upright axis, thus providing adjustment of lateral offset between the machine and a towing vehicle as the combination advances and more particularly to means for controlling the pivoting of the tongue about the frame.

The general mode of operation of towed machines, such as harvesters including mower-conditioners and the like and having swingable tongues, is well known as is the particular portion of their operation in which adjustment is made between a transport position and an operating position. In the former the machine trails generally rearwardly behind the towing vehicle to keep overall transport width of the combination to a minimum while in an operating position, for example that of a harvester in a field of crop, the machine is offset rearwardly and to one side of a towing vehicle such as a tractor so that the tractor does not pass over the ground or crop material to be treated or harvested.

In many machines the swinging of the tongue in relation to the machine frame is effected by a hydraulic actuator such as a conventional piston-type hydraulic cylinder. Typically, the transport or carrying wheels of the machine are fixed (non-castering) so that realignment of the machine behind the towing vehicle can be made only as the combination advances, the hydraulic actuator acting in effect as a steering means permitting not only changing between particular operating and transport positions, but also, when a suitable control valve is provided for the actuator, adjustment over a range of positions, to suit particular operating and transport conditions.

It is desirable, particularly when transporting on a highway to be able to lock the tongue in relation to the machine frame so as to guard against accidental swinging of the machine from a position generally behind the towing vehicle into an offset position where it may collide with oncoming traffic or strike an obstruction beside the road. Such an accidental swinging could arise from inadvertent manipulation of the hydraulic actuator control or from a failure of the hydraulic system between the towing vehicle and the actuator causing a loss of hydraulic pressure and allowing the hydraulic actuator to float.

It is known to provide mechanical means to prevent the tongue of mobile towed machines from inadvertent swinging but such means typically suffer from the disadvantage of being limited by practical considerations to only one or a small number of spaced locked positions and manipulation of the locking device from an unlocked to a locked condition is often difficult. Before engaging the lock, the mating portions connected to the tongue and frame respectively may have to be precisely aligned by maneuvering of the machine, if it is connected to the towing vehicle, so as to cause relative pivoting between tongue and frame. Also, disengagement of such locks is often difficult because, for example, if the machine is stopped on uneven ground, there can be residual horizontal components of force on the wheels resulting in a turning or steering force on the machine and hence a load within the locking device hampering disengagement.

The engagement of a mechanical locking device may require an operator to be closely adjacent a machine when it is being steered or maneuvered to a position where it is possible to manually engage the locking device and consequently there is a danger of the operator being struck and injured by the machine or towing vehicle.

SUMMARY OF THE INVENTION

Accordingly, an object of the present invention is to provide in a towed machine having a tongue swingable in relation to the machine frame an improved means for controlling the swinging of the tongue. More particularly, it is an object to provide in a machine where the swinging of the tongue is effected by a hydraulic actuator connected between the tongue and the machine frame, an improved means for locking the tongue in any given swung position including a transport position in which the machine is disposed generally behind a towing vehicle such as a tractor.

A shut-off valve is provided in a supply line to a hydraulic actuator between a hydraulic power source and a control valve on the tractor and the actuator so that by closing the shut-off valve, hydraulic fluid may be trapped in the actuator creating a hydraulic lock. The actuator is thus disconnected from the hydraulic power source and control valve so that inadvertent operation of the control valve does not cause a swinging of the tongue relative to the machine. Further, any rupture of the hydraulic system between the power source and the shut-off valve causing loss of hydraulic pressure would not result in uncontrolled swinging of the tongue.

It is a feature of the invention that the shut-off valve may be closed to lock and maintain the tongue in any desired position making it possible, for example, to choose a particular transport position to suit particular highway conditions or other considerations.

It is another feature of the invention that the shut-off valve may be placed in the hydraulic fluid line close to the hydraulic actuator so as to reduce to a minimum the extent of that part of the system where a rupture or failure causing a loss of hydraulic pressure could result in accidental swinging of the tongue.

Another feature of the invention is that the shut-off valve may be placed within operator reach of the rear of the machine so that the operator may lock the tongue from the relative safety of a position rearward of the machine. An advantage of the invention is that the tongue may be locked in any swung position relative to the frame so that an operator is not required to be stationed close to the machine while it is maneuvered to achieve a precise positioning of the tongue as is required in some mechanical locking devices. A further advantage of the invention is that when the tongue is locked, variations in hydraulic pressure upstream of the shut-off valve do not effect the locked condition of the hydraulic actuator.

It is a feature of the invention that the shut-off valve may be provided with means visually indicating whether the valve is open or closed and, for operator convenience, such visual indication may be arranged to be visible from the operator's station of the towing vehicle.

Another advantage of the invention is that compared with mechanical locking devices, the need for heavy structural members with strength sufficient to lock the tongue against full hydraulic actuator force is eliminated and the cost of providing the locking device may, therefore, be reduced.

DESCRIPTION OF THE PREFERRED EMBODIMENT

Figure 1:
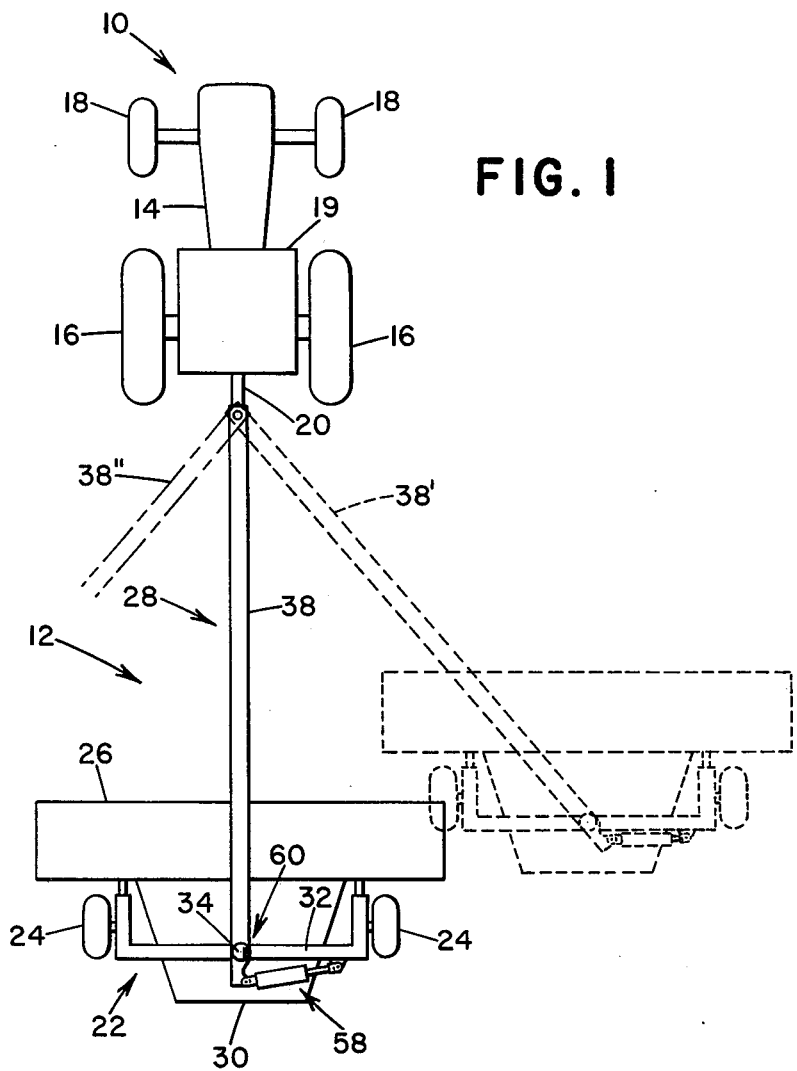
FIG. 1 is a diagrammatic top view of a tractor implement combination embodying the invention.

The invention is embodied in a tractor-implement combination diagrammatically illustrated in FIG. 1 where the numeral 10 indicates a tractor in general and the numeral 12 indicates the implement. The figure represents a generalized pull-type implement 12 somewhat similar to a mower-conditioner.

The tractor includes a fore-and-aft body 14 mounted on a pair of rear drive wheels 16 and steerable front wheels 18 and an operator's station 19. A conventional tractor drawbar 20 extends rearwardly between the rear wheels 16.

The implement includes a main frame 22 supported above the ground by a pair of opposite transport wheels 24 and itself supporting a forwardly mounted harvesting header 26. The implement 12 also includes a tongue assembly 28 and a rearwardly extending crop deflector hood 30. The alignment of the wheels 24 in relation to the main frame 22 is fixed (they are "non-castering") and they thus have a constant steering angle in relation to the frame.

Figure 4:
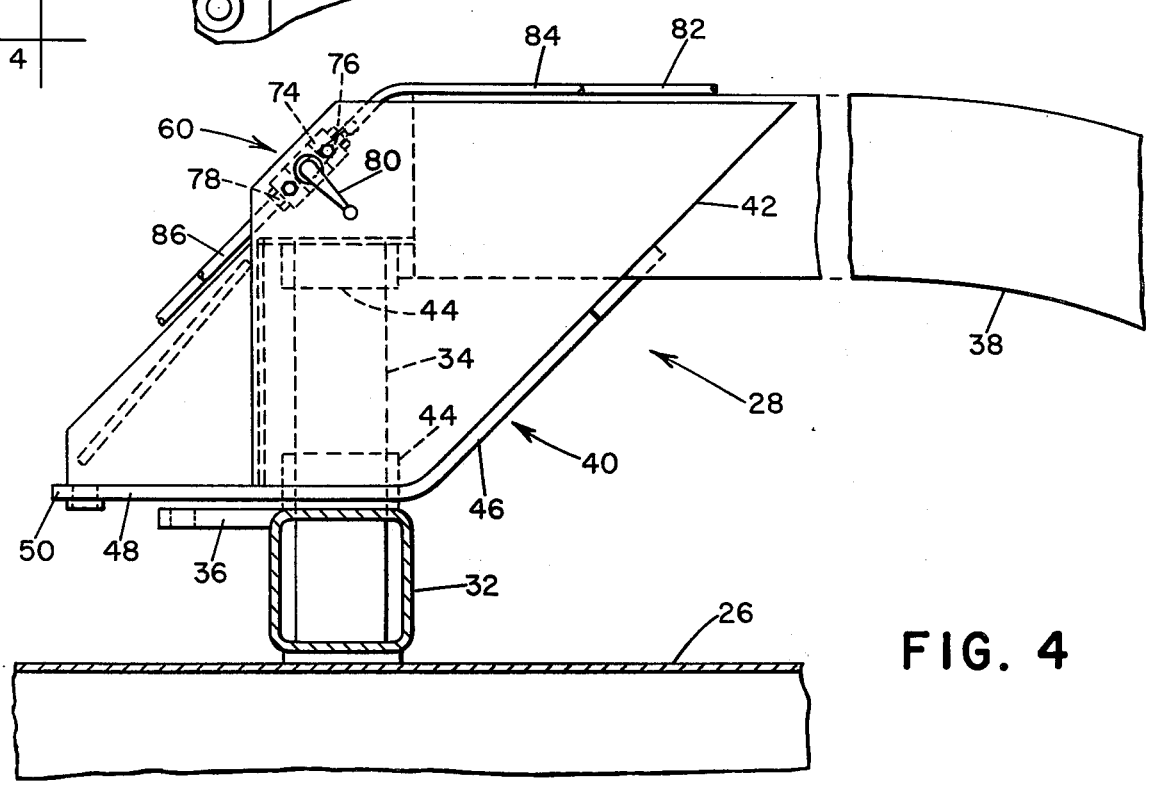
FIG. 4 is an enlarged partial right side elevation of the tongue pivot area taken approximately on line 4—4 of FIG. 3, with the hydraulic cylinder removed.

The main frame 22 includes a transverse beam 32 to which is rigidly attached approximately on a fore-and-aft center line of the machine an approximately upright pivot post 34, seen best in FIG. 4. A rearwardly extending hydraulic cylinder bracket 36 is attached rigidly to the transverse beam 32 towards it right-hand end. ("Right-hand" being to an observer's right when standing at the rear of the combination and facing in the direction of travel.)

The tongue assembly 28 has, as is indicated in FIG. 4, an arch-like form extending from the main frame 22 forward over the header and curving down to make a conventional pivoting connection with the tractor drawbar 20. The tongue assembly 28 includes an elongated forward tongue portion 38 and a tongue pivot assembly 40 made up of approximately upright opposite parallelogram-shaped gussets or side plates 42 attached rigidly to and extending downward from the rearward end of the tongue 38 and embracing between them and rigidly securing a pair of vertically spaced tongue pivot bearings 44 which are journaled on the pivot post 34. A tongue pivot bottom plate 46 extends between the forward and lower edges of the opposite gussets 42, a rearward horizontal portion 48 being shaped to provide a cylinder attaching lug 50, best seen in FIG. 3.

Figure 2:
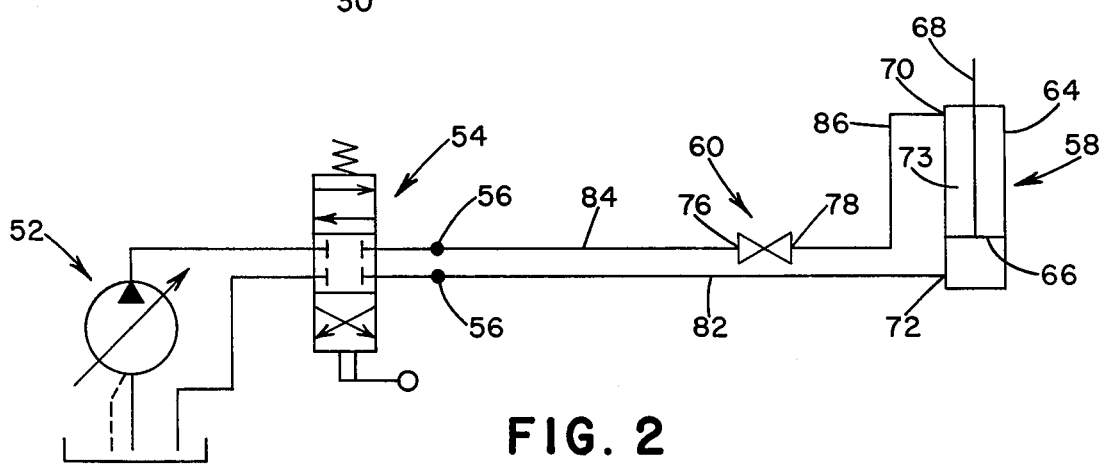
FIG. 2 is a hydraulic circuit diagram of portions of the hydraulic system of the tractor and the implement.

The portions of the tractor and implement hydraulic system concerned with the present invention are shown diagrammatically in FIG. 2 and include as an hydraulic power source a conventional pump and reservoir, indicated by the numeral 52, and a manually operated control valve 54 for controlling the hydraulic fluid flow through a pair of conventional hydraulic coupling elements 56 on the rear of the tractor. Hydraulic components carried on the implement 12 include a hydraulic actuator such as the double-acting piston-type cylinder indicated by the numeral 58 and shown in FIG. 3 connected between the hydraulic cylinder bracket 36 attached to the main frame 22 and the cylinder lug 50 forming part of the tongue assembly 28. Also carried on the implement 12 is a manually operated shut-off valve assembly 60 attached to the tongue assembly 28 above and adjacent to the tongue pivot.

The hydraulic cylinder 58 is conventional and includes a housing 64, piston 66 (shown only in FIG. 2), piston rod 68 and rod-end and head-end oil ports 70 and 72, respectively. The variable space within the cylinder housing 64 between the piston 66 and the rod-end may be considered a pressure chamber 73 (and similarly for the housing space on the other side of the piston).

The shut-off valve 60 is conventional and includes a body 74 having inlet and outlet ports 76 and 78, respectively, and an operating lever 80 pivoted in the body. The valve 60 is attached by suitable fasteners to the right-hand tongue pivot gusset 42 so that its body is shielded between the opposite gussets 42 but with its operating lever 80 extending outwardly to the right from the right-hand gusset 42 so that the lever 80 is conveniently accessible and visible.

Hydraulic hoses are provided and connected as follows: a head-end hose 82 connected between one of the tractor couplings 56 and the cylinder head-end port 72, a rod-end hose 84 between the other tractor coupling 56 and the inlet port 76 of the shut-off valve 60 and a lock hose 86 between the outlet port 78 of the shut-off valve 60 and the rod-end port 70 of the hydraulic cylinder 58.

In operation, the tractor-implement combination advances with the implement tongue 38 coupled to the tractor drawbar 20 in the conventional way and the head-end and rod-end hoses 82 and 84 of the implement coupled to the tractor couplings 56.

In FIG. 1 the tractor-implement combination is shown in full line in a typical transport configuration in which the implement 12 is trailing directly rearwardly of the tractor 10 so that the combination would occupy a minimum width of highway during transport. For safety, the shut-off valve 60 would be closed as indicated visually by the downward and forwardly extending position of the lever 80 shown in full line FIG. 4. In this condition oil is trapped in the pressure chamber 73 of the hydraulic cylinder housing 64 and in the lock hose 86 between the piston 66 of the cylinder and the outlet port 78 of the shut-off valve 60, thus preventing any displacement of the piston 66 and hence contraction or extension of the cylinder 58 under the action of axial forces applied to the cylinder 58 due to forces imposed between the tongue assembly 28 and the implement main frame 22 by forces on the wheels 24 or by inertia between the tongue assembly and the remainder of the implement as the implement is being pulled. Similarly, inadvertent operation of the control valve 54 on the tractor applying hydraulic pressure through the head-end and rod-end hoses 82 and 84 respectively would be prevented from extending to retracting the hydraulic cylinder 58 due to the isolating action of the valve 60 and the trapping of hydraulic oil between the piston 66 and the shut-off valve 60.

To prepare the tractor-implement combination for operation, for example in field of crop, the combination is brought to a halt to allow an operator to approach the rear of the machine from the rear from where he may move the operating lever 80 of the control valve 60 from the closed or locked position shown in full line in FIG. 4 to an upwardly and forwardly extending open or unlocked position shown by the broken line in FIG. 4. As indicated in FIG. 1, the implement 12 has a rearward perimeter defined in its center portion by the extremities of the crop deflecting hood 30 and the shut-off valve 60 is within reach of an operator from the vicinity of this rearward perimeter but not from a position in front of the machine because of the extent of the intervening header 26. With the shut-off valve in the unlocked position, both the oil ports 70 and 72 of the hydraulic cylinder 58 are open to the tractor hydraulic system couplings 56 and, as the combination advances, the operator may manipulate the control valve 54 to extend or retract the cylinder 58, thus creating a steering or slewing force between the implement tongue assembly 28 and the implement frame 22 and hence the wheels 24 and causing the implement 12 to swing to left or right of a fore-and-aft position. In FIG. 1 the implement 12 is shown in broken line in a typical right-hand operating position with the implement offset sufficiently that the tractor may run on ground from which crop has already been harvested, thus avoiding damage to the crop. A similar left-hand operating position is also indicated in FIG. 1, by broken lines with the corresponding right- and left-hand tongue positions being indicated in both FIGS. 1 and 3 by the numerals 38' and 38" respectively.

When field operation is finished, the control valve 54 and hence the hydraulic cylinder 58 are manipulated to swing the implement 12 into a transport position behind the tractor (similar to that shown in full line in FIG. 1) and the combination is brought to a halt allowing an operator once more to move the shut-off valve lever 80 into the closed or tongue-locked position. The convenience of a visual indication of whether the tongue is locked or unlocked, clearly visible to an operator adjacent the implement 12 or in the tractor operator's station 19, as provided by the "tell-tale" shut-off valve lever 80 of the present embodiment, will be readily apparent.

Figure 3:
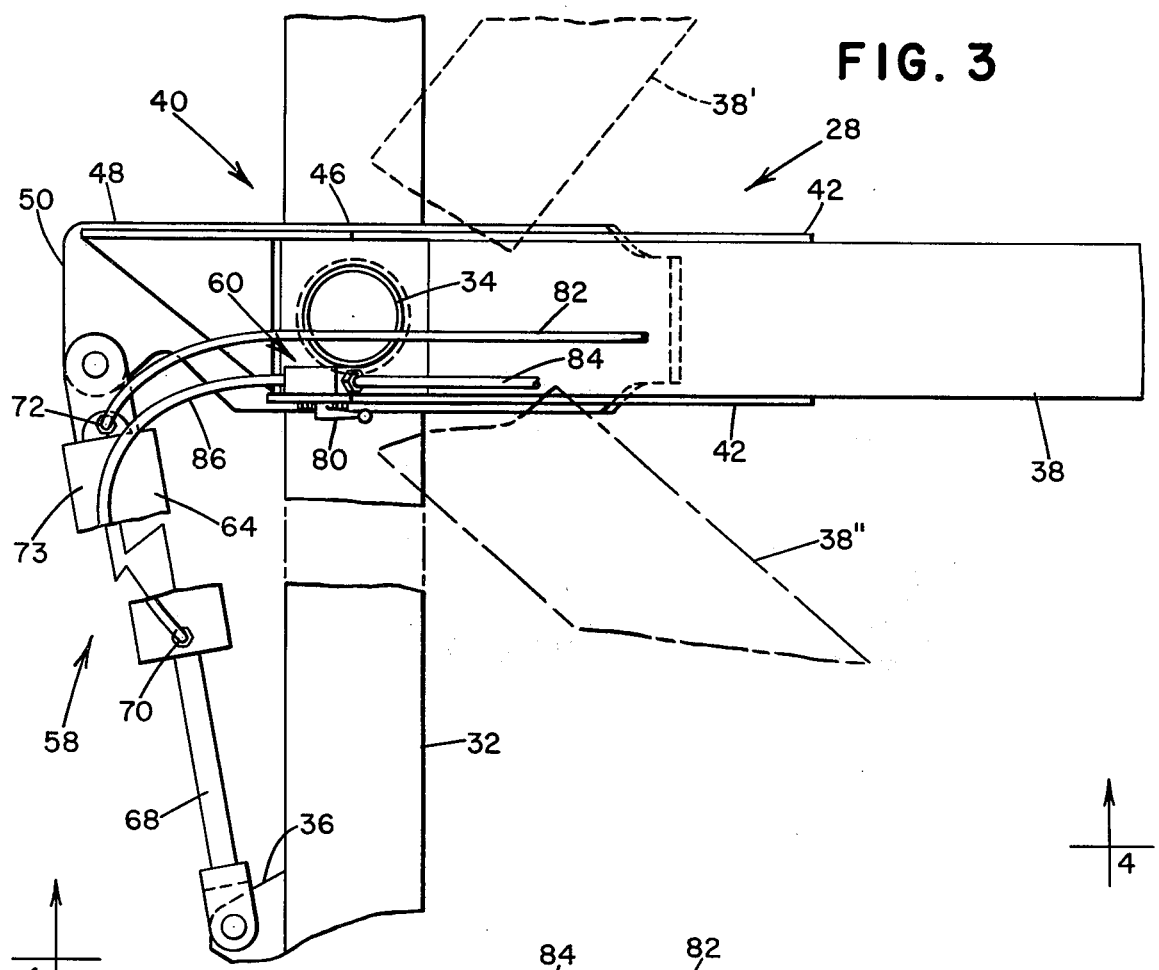
FIG. 3 is an enlarged partial top view of the tongue pivot area of the implement showing the hydraulic cylinder for swinging the tongue.

As can be seen from the drawings and particularly FIG. 3, the shut-off valve 60 is disposed close to the hydraulic cylinder 58 so that the locking hose 86 in which, along with the pressure chamber 73 of cylinder 58, oil is trapped to provide the transport or tongue-lock condition, is short, thus reducing the chances of accidental rupture and loss of oil and consequently uncontrolled swinging of the implement laterally in relation to the tractor due to the unlocking of the tongue 38 and consequently the possibility of collision with oncoming vehicles or roadside obstacles during transport. With hydraulic oil locked between the shut-off valve 60 and the cylinder piston 66 as provided by the invention, accidental rupture of the remaining hoses of the system head-end and rod-end hoses 82 and 84, respectively, would not result in unlocking the tongue and possibly dangerous swinging of the implement in relation to the tractor.

It will be obvious that the tongue-locking system of the invention makes it possible to lock the tongue in any desired swung position corresponding to any condition of extension of the hydraulic cylinder 58, including a range of operating positions and transport positions, without the need for precise alignment of any juxtaposed parts, in that the shut-off valve 60 can be closed to lock the system at any point within the total range of swing permitted by the dimensions of the hydraulic cylinder 58 and related parts of the implement frame 22 and tongue assembly 28 and the system may be said to offer continously variable adjustment.

We claim:

1. In a mobile machine designed to be pulled over the ground by a tractor, the machine having a rearward perimeter and including a main frame supported above the ground on at least one transport wheel having a steering angle normally fixed in relation to the main frame and including a forward extending elongated tongue releasably and pivotally connected to the tractor, said tongue being pivotally connected to and swingable in relation to the main frame about a generally upright axis so as to displace the machine laterally in relation to the tractor as the machine is advanced over the ground, such displacement embracing a range of operating positions in which the machine is substantially offset to the side of the tractor and a range of transport positions in which the machine trails substantially rearward of the tractor, and the tractor including a hydraulic coupling connected to a hydraulic power source on the tractor and a control valve manipulatable to control the flow of hydraulic fluid between the source and the coupling, improved control means for the tongue comprising:

a hydraulic actuator having an inlet, mechanically connected between the tongue and the frame and operable to swing the tongue into a preselected position relative to the frame as the machine is advanced; and a shut-off valve having an inlet connected to the coupling and an outlet connected to the actuator inlet, selectively operable between an open condition and a closed condition in which the actuator inlet is respectively operatively connected to or disconnected from the coupling so that manipulation of the control valve is, respectively, effective in swinging the tongue relative to the frame or ineffective so that the preselected position is maintained.

2. The invention defined in claim 1 wherein the actuator includes a pressure chamber in fluid communication with the actuator inlet and swinging of the tongue in relation to the frame is directly dependent upon flow of oil into and out of the pressure chamber and closing of the shut-off valve prevents flow of oil into or out of the chamber.

3. The invention defined in claim 1 wherein the shut-off valve includes means visible from the tractor for indicating visually whether the valve is open or closed.

4. The invention defined in claim 3 wherein the shut-off valve is manually operated and includes a control lever shiftable between first and second, open and closed positions, respectively, and said means for indicating visually whether or not the valve is open or closed comprises alternatively the appearance of said lever in said respective positions.

5. The invention defined in claim 1 wherein the shut-off valve is carried on the machine adjacent the hydraulic actuator.

6. The invention defined in claim 1 wherein the shut-off valve is carried on the machine adjacent the pivotal connection between the tongue and the main frame.

7. The invention defined in claim 1 wherein the shut-off valve is carried on the machine adjacent the rearward perimeter of said machine.

8. The invention defined in claim 1 wherein the hydraulic actuator comprises an axially telescoping hydraulic cylinder including a cylindrical chamber in fluid communication with the actuator inlet and a piston carried within the chamber closely fitting the chamber for axial sliding motion therein, said motion being operatively associated with flow of hydraulic fluid into and out of the chamber and directly related to the swinging of the tongue in relation to the frame and wherein closing of the shut-off valve is effective to trap hydraulic fluid in the chamber so that swinging of the tongue in relation to the frame is prevented.

9. In a mobile machine designed to be pulled over the ground by a tractor, the machine having a rearward perimeter and including a main frame supported above the ground on at least one transport wheel having a steering angle normally fixed in relation to the main frame and including a forward extending elongated tongue releasably and pivotally connected to the tractor, said tongue being pivotally connected to and swingable in relation to the main frame about a generally upright axis so as to displace the machine laterally in relation to the tractor as the machine is advanced over the ground, such displacement embracing a range of operating positions in which the machine is substantially offset to the side of the tractor and a range of transport positions in which the machine trails substantially rearward of the tractor, and the tractor including a hydraulic coupling connected to a hydraulic power source on the tractor and a control valve manipulatable to control the flow of hydraulic fluid between the source and the coupling, improved control means for the tongue comprising:

a hydraulic actuator having an inlet, mechanically connected between the tongue and the frame and operable to swing the tongue relative to the frame; and a shut-off valve accessible from the rearward perimeter of the machine having an inlet connected to the coupling and an outlet connected to the actuator inlet, selectively operable between an open condition and a closed condition in which hydraulic fluid is trapped in the actuator so that the actuator is inoperable.

* * * * *